(No Model.)  2 Sheets—Sheet 1.

S. M. PARKER.
COW STABLE APPLIANCE.

No. 568,788. Patented Oct. 6, 1896.

Witnesses
B. P. Shepherd.

Inventor
Sewell M. Parker
By
his attorneys (No Model.) 2 Sheets—Sheet 2.

S. M. PARKER.
COW STABLE APPLIANCE.

No. 568,788. Patented Oct. 6, 1896.

Witnesses
Richard Paul,
B. P. Shepherd

Inventor
Sewell M. Parker
By Paul O. Hawley
his attorneys.

UNITED STATES PATENT OFFICE.

SEWELL M. PARKER, OF ROBBINSDALE, MINNESOTA.

COW-STABLE APPLIANCE.

SPECIFICATION forming part of Letters Patent No. 568,788, dated October 6, 1896.

Application filed December 19, 1895. Serial No. 572,642. (No model.)

*To all whom it may concern:*

Be it known that I, SEWELL M. PARKER, of Robbinsdale, county of Hennepin, State of Minnesota, have invented certain new and useful Improvements in Cow-Stable Appliances, of which the following is a specification.

My invention relates to devices for keeping the cows and the floor of the tie-up clean and dry, and the object I have in view is to provide a receptacle suitably suspended in the rear of the tie-up to receive the droppings from the cow and arranged to move back and forth to adapt itself to the different positions of the animal while standing or lying in the stall.

To this end my invention consists in a pan or receptacle suspended upon an inclined track above the stall in position to receive the droppings and arranged to be moved back out of the way by the animal while in the act of lying down and allowed to resume its former position when the animal gets up again, and, further, my invention consists in various details of construction and in combinations, all as hereinafter described, and particularly pointed out in the claims.

Figure 1:
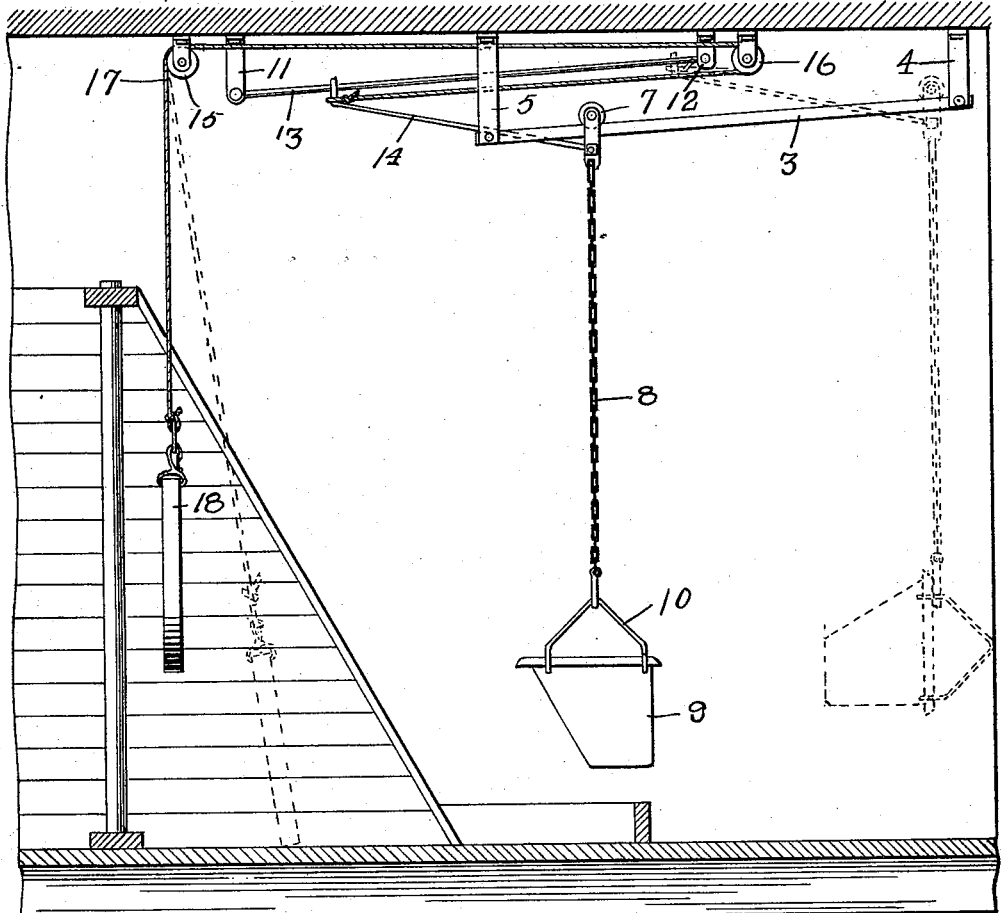
Figure 2:
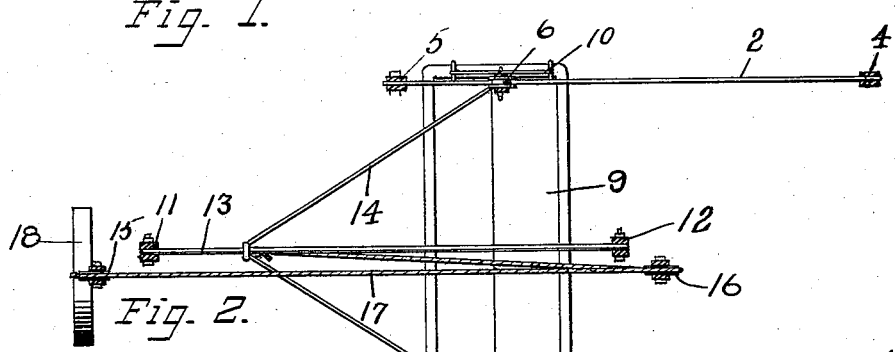
Figure 3:
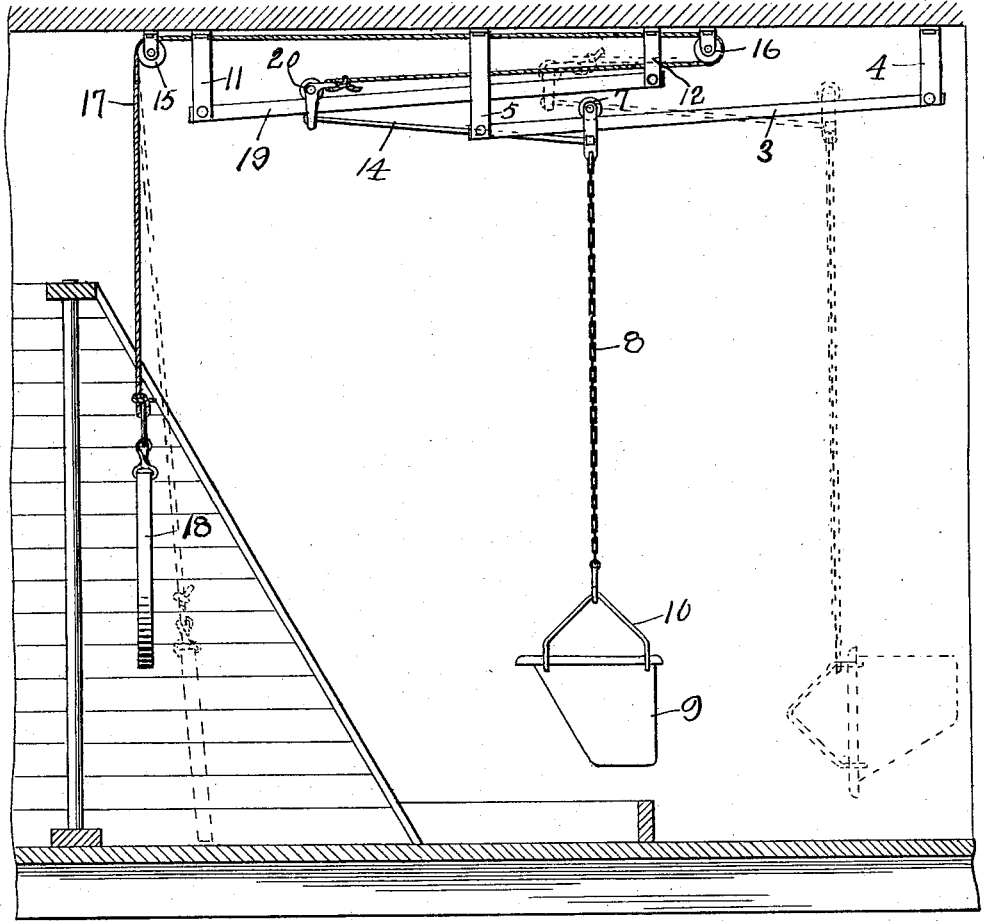
Figure 4:
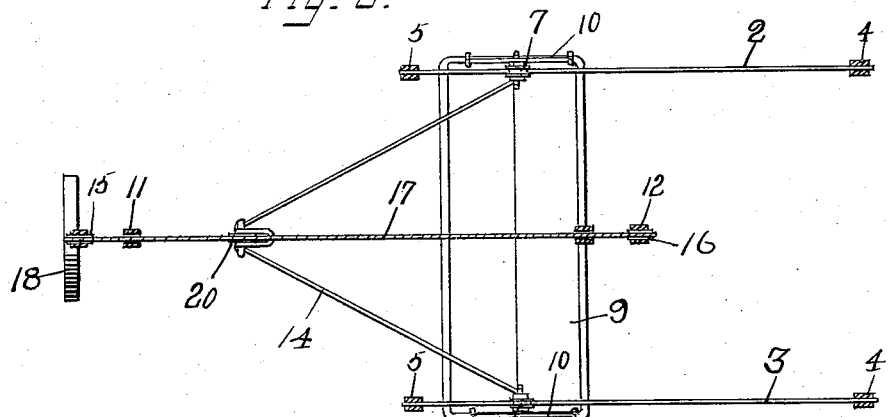

In the accompanying drawings, forming part of this specification, Figure 1 is a view of a cow-stall embodying my invention. Fig. 2 is a plan view of the operating mechanism. Fig. 3 is a view of a stall, showing a modified form of the device. Fig. 4 is a plan view of the modified construction.

In the drawings is shown a cow-stall of the ordinary size and construction having, preferably, a level floor and provided with a box filled with sawdust or other suitable material, forming a place for the animal to stand during the day and a bed at night. In the rear of the tie-up above the stall I suspend a track, comprising the parallel rails 2 and 3, supported by the hangers 4 and 5, depending from the ceiling. The hangers 5 are longer than the others, so that the rails will be inclined toward the front of the stall, as shown in Fig. 1. Upon the rails of the tracks I arrange pulleys 6 and 7, to which the upper end of a chain or cord 8 is connected, which supports the pan or receptacle 9, secured to the lower end thereof. The pan 9 may be of any suitable material, preferably sheet metal, rectangular in form, and extending nearly across the stall and provided with a bail 10, to which the end of the chain 8 is connected by a hook or in any other suitable manner. Between the rails 2 and 3 and supported in a similar manner from the ceiling by hangers 11 and 12 is a rod or pipe 13, forming a third rail, also inclined toward the front of the stall, and extending about half its length beyond the forward end of the rails 2 and 3. I provide a V-shaped portion 14, having its ends secured to the pulleys 6 and 7 and its apex formed into a loop to encircle the rod 13 and slide freely in a horizontal direction thereon. Near each end of the rod or third rail 13 I provide the pulleys 15 and 16, secured to the ceiling and over which passes a chain or cord 17, having one end secured to the part 14 at its apex and the other end connected to a band or girth 18, which passes around the body of the cow just back of the fore legs. From this construction it is obvious that when the cord or chain 17 is drawn down the V-shaped portion 14 will be moved along the third rail and the pulleys 6 and 7 pushed up the inclined rails 2 and 3 a corresponding distance and the pan or receptacle moved back to the rear of the tie-up away from the animal. It therefore follows that when the animal lies down the receptacle will be moved back, and when she gets up and the cord or chain 17 becomes slack the pan will be allowed to resume its former position, owing to the forward incline of the rails 2 and 3.

I provide a little slack in the cord 17 to permit the animal to move about in the stall without moving the pan from its normal position until such time as she lies down again.

In place of the rod 13 I may provide a third rail in shape of a bar 19, similar to the rails 2 and 3 and provided with a pulley 20, freely slidable thereon and connected at its lower end with the apex of the V-shaped portion 14. In this construction the cord or chain 17 runs along above the rail instead of below it, as shown in Fig. 1.

When the pan has been pushed back to the position indicated by dotted lines, it is tilted and its contents emptied into a wheelbarrow or other suitable receptacle.

Having thus described my invention, I claim as new and desire to secure by Letters Patent—

1. The combination, with a cow-stall, of the tracks arranged over the stall, the pulleys on said track, a pan or receptacle, a flexible connection between said pulleys and said pan, and means connecting said pulleys with the cow, whereby when the animal lies down the pan will be drawn away from the cow toward the rear of the stall, for the purpose set forth.

2. The combination, with a cow-stall, of the forwardly-inclined track arranged over the same, the pulleys, a pan or receptacle, a flexible connection between said pulleys and said pan, and means connecting said pulleys with the cow, whereby when the animal lies down the pan will be drawn away from the cow toward the rear of the stall for the purpose set forth.

3. The combination, with a cow-stall, of the forwardly-inclined track suspended above the same, the pulleys thereon, a pan or receptacle supported thereby, flexible connections between said pulleys and the cow, whereby the pan or receptacle will be permitted to return to its normal position, after being drawn toward the rear of the stall by the movement of the animal while lying down substantially as described.

4. The combination, with the stall or stand, of the tracks arranged above the same, a pan suspended from two of the tracks, a brace slidable on a third track or rail and adapted to communicate its movement to the pan, and means for connecting the brace to the animal whereby as the animal lies down the pan will be moved back, substantially as described.

5. A cow-stable appliance, comprising parallel rails suspended above the stall, pulleys to run thereon, a pan or receptacle supported by said pulleys, a rod forming a third rail arranged between said first-named rails and parallel thereto, a V-shaped brace or connection between said pulleys and said third rail, said connection having a looped portion to clasp said third rail and to slide freely thereon, a flexible connection between said brace and the cow standing in the stall, whereby when the animal lies down the pan will be pushed up the track toward the rear of the stall for the purpose set forth.

6. A cow-stable appliance, comprising forwardly-inclined rails suspended above the stall, pulleys to run thereon, a pan or receptacle, a flexible connection between said pan and the pulleys, a rod forming a third rail arranged between said first-named rails and also forwardly inclined, a V-shaped part provided with a loop at its apex to encircle said third rail and to slide thereon, and having its ends connected to said pulleys, the rope or chain connecting said brace with the animal, the pulley over which said rope or chain passes, whereby when the animal lies down the pulleys supporting the pan will be pushed up the inclined track and the pan moved to the back of the stall, substantially as described.

In testimony whereof I have hereunto set my hand this 25th day of November, A. D. 1895.

SEWELL M. PARKER.

In presence of—
C. G. HAWLEY,
RICHARD PAUL.